Sept. 9, 1969        H. M. LYMAN        3,465,805

DRIVE MEANS FOR PARTITIONS AND THE LIKE

Filed March 29, 1968        2 Sheets-Sheet 1

*INVENTOR.*
HUGH M. LYMAN
BY:

ATTORNEY

INVENTOR.
HUGH M. LYMAN
BY:
ATTORNEY

United States Patent Office 3,465,805
Patented Sept. 9, 1969

3,465,805
DRIVE MEANS FOR PARTITIONS AND THE LIKE
Hugh M. Lyman, 2352 Oakcrest Lane,
Salt Lake City, Utah 84121
Filed Mar. 29, 1968, Ser. No. 717,338
Int. Cl. E06b 9/08; E05f 15/14
U.S. Cl. 160—23
9 Claims

ABSTRACT OF THE DISCLOSURE

A drive means, wherein a toothed drive member slides between meshing engagement with two spaced, toothed, driven members, each of which is adapted to be rotated with the drive member in one direction when the drive member is in engagement therewith and is turned in the one direction, and to repel the drive member and to force it into driving engagement with the other driven member when the direction of rotation of the drive member is reversed. The spaced driven members are each mounted to be rotatable independently of the drive member and are constructed to perform a desired mechanical function.

BRIEF DESCRIPTION

This invention relates to mechanical drive means wherein spaced driven members are individually and separately rotated in opposite directions to perform a desired mechanical function.

More particularly, the drive mechanism of the invention is useful in the alternative driving of a drum upon which a cable used to pull a coilable partition from a housing is wound, or the driving of a post on which the partition itself is wound. When the cable is being wound on the drum the partition is unwrapped from the post and when the post is rotated to wind the partition thereon the cable is pulled from the drum. The same drive mechanism can also be used for other purposes. It can be used in virtually any arrangement where it is desired to individually drive two members and where one must be free to independently rotate while the other is being driven. This allows the free independently rotating driven member to turn at any variable or constant speed, as required to perform its function.

Coilable partitions and drive means therefor have long been known. U.S. Patent No. 1,621,717, for example, shows a partition made of vertically hanging, interconnected, wood slats, a post on which the partition is wound in and a cable that is wrapped around a drum to pull the partition out to an extended condition. Generally, similar arrangements, but differing in the structural details employed, are shown in U.S. Patents No. 2,934,139, and Re. 25,422.

So far as I am aware, however, there has not heretofore been developed a simple, reliable drive mechanism that can be used to coil and extend partitions and the like and that does not involve the use of expensive gearing, clutch assemblies, bearing mounted, rotatable central shafts or expensive assembly techniques.

It is an object of the present invention to provide a relatively simple and inexpensive drive mechanism that can be used to coil and extend partitions and the like.

Principal features of the invention include a central, non-rotating main shaft; a first driven member having a cable drum thereon, rotatably mounted on the main shaft and held against movement therealong; a second driven member spaced from the first driven member and, rotatably mounted on and held against axial movement along the main shaft; and a drive member axially movable along the main shaft, between the first and second driven members.

The second driven member is mechanically connected to a post about which the partition is adapted to be wound such that rotation of the second driven member in one direction will drive the post to wind the partition thereon. A brake, acting on the cable drum holds it against complete free-wheeling, but allows it to rotate independently as the cable is pulled therefrom and the partition is coiled around the post.

The drive member is provided with at least one tooth on each end thereof and the teeth are constructed to serve both as cam followers and as meshing teeth through which rotation of the drive member is transmitted to the driven members. The first and second driven members are each provided with teeth on their faces adjacent to the drive member between them. The teeth of the driven members are constructed to act as cams when the drive member is rotated one direction with respect thereto and as both cams and meshing teeth, through which rotation of the drive member is transmitted to the driven member when the drive member is rotated in the opposite direction.

Additional objects and features will become apparent from the following detailed description and drawings, disclosing what is presently contemplated as being the best mode of the invention.

THE DRAWINGS

Figure 2:
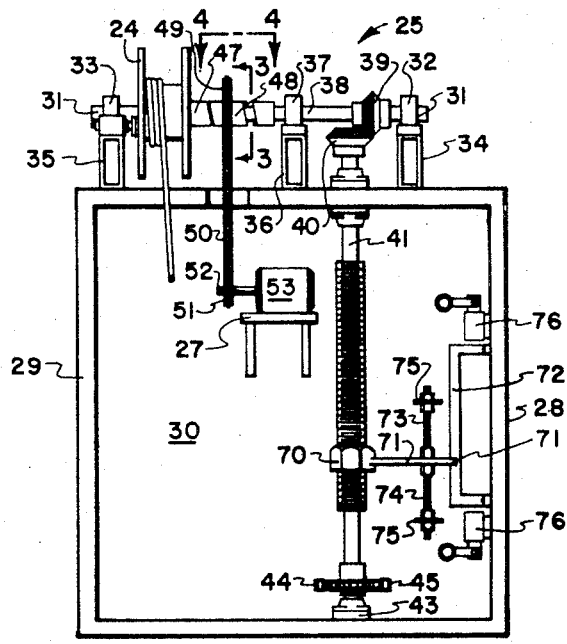
FIG. 2 is a front plan view of the drive means.
Figure 3:
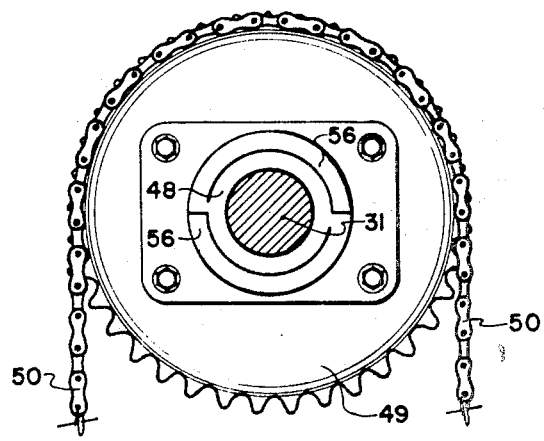
Figure 4:
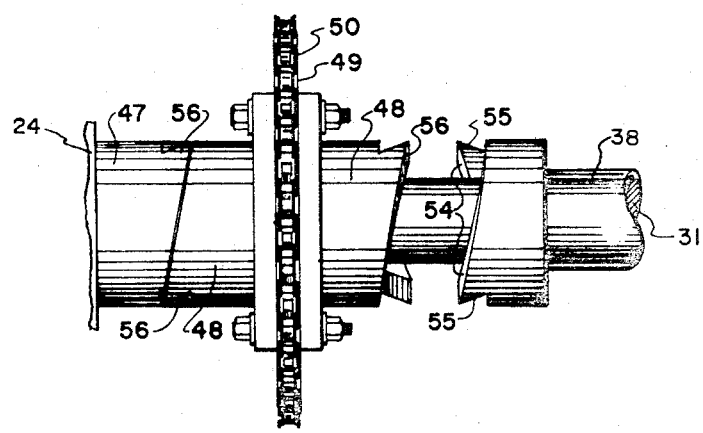
Figure 5:
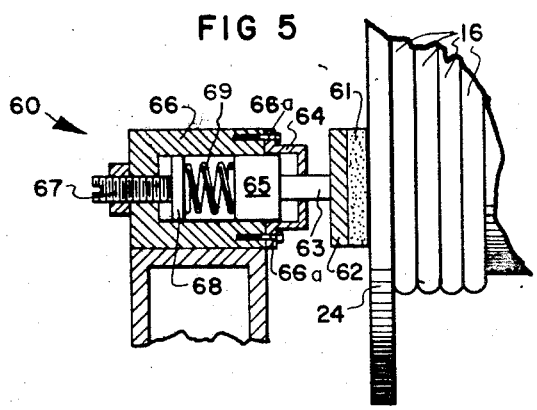

FIG. 3, a vertical section taken on the line 3—3 of FIG. 2;

FIG. 4, a top plan view of the drive member, with the driven members shown fragmentarily, taken on the line 4—4 of FIG. 2; and FIG. 5, an enlarged view of the cable-drum brake, with the brake housing partially broken away to show the structure therein and the cable drum shown fragmentarily.

DETAILED DESCRIPTION

Refering now to the drawings:

In the illustrated preferred embodiment, the partition 10, made of parallel, interconnected slats 11 and 11a and a lead stile 11b, has an end slat 11a tangentially connected to an upright post 12. The upper and lower ends of the slats are guided within upper and lower tracks 13 and 14, and the upper ends have rollers 15 at the opposite sides thereof such that they engage inturned lower edges 13a of the upper track 13 to suspend the partition. In some instances, the lower ends of the slats may also be provided with rollers (not shown) that run inside the lower track 14.

A cable 16 has one end fixed at 17 to the upper end of the lead stile 11b connected to a slat 11 and is passed around a pulley 18 at the end of track 13 remote from post 12, through track 13, around a pulley 19 at the other end of track 13, around a pulley 20 at the end of track 14 nearest post 12, and through track 14 to be secured at 21 to the lower end of lead stile 11b. Thereafter, the cable is passed around a pulley 22 at the other end of track 14, back through track 14 and around another pulley 23 before being connected to a cable drum 24.

Rotation of cable drum 24 in one direction, while post 12 is allowed to turn in an unwinding direction, will wind the cable 16 thereon and will pull the partition 11 toward the pulleys 18 and 22 and off of post 12. Conversely, turning of post 12 in a winding direction, while cable drum 24 is allowed to turn in an opposite direction will wind the partition around post 12.

The operating mechanisms for alternatively driving the cable drum 24 or the post 12 is shown generally at 25, and can best be seen in FIGS. 2–6.

It will be understood that support and housing structure other than that herein disclosed can be used, and that normally the operating mechanism 25, post 12, and pulleys 19, 20 and 23, are mounted inside an unobtrusive housing positioned closely adjacent to tracks 13 and 14. However, for convenience of illustration, the housing has been omitted, and the operating mechanism is shown mounted on shelves 26 and 27 supported by legs 28 and 29 and a back wall 30.

The operating mechanism 25 includes a non-rotating main shaft 31 that is held by clamps 32 and 33, respectively, on members 34 and 35 that extend upwardly from shelf 26.

Another member 36 extends upwardly from shelf 26 to support a collar 37 through which a sleeve 38 is journaled around shaft 31, has a bevelled gear 39 formed therearound, and has teeth, which will hereafter be described in greater detail, formed on one end thereof. Sleeve 38 and the bevelled gear thus comprise a first driven member.

Bevelled gear 39 is in mesh with another bevelled gear 40, carried by the upper end of an upright shaft 41. Shaft 41 is journaled through a support mounting 42, affixed to shelf 26 and is journaled at its lower end in a bearing housing 43. A sprocket 44 is affixed to shaft 41 and a chain 45 drivingly interconnects sprocket 44 and a sprocket 46 on the upright post 12 about which the partition 10 is adapted to be coiled. Thus, rotation of sleeve 38 and bevelled gear 39 in one direction will turn bevelled gear 40, shaft 41, sprocket 44, chain 45 and sprocket 46 such that post 12 is turned to wrap the partition 10 therearound.

Another sleeve 47 is journaled on main shaft 31 such that the sleeve and the cable drum 24, which is fixed thereto, can rotate around the main shaft. Split rings, not shown, but fitted into matching grooves in the main shaft and sleeves 47 and 38, prevents movement of the sleeve axially along the main shaft, while allowing the sleeves to rotate. Sleeve 47 is spaced from sleeve 38 and has teeth, which will be hereinafter described in detail, formed on its end thereof nearest the toothed end of sleeve 38. The sleeve 47 and cable drum 24, fixed thereto, comprise a second driven member.

A drive member 48 is mounted on main shaft 31, between the sleeves 38 and 47. The drive member is both rotatable about main shaft 31 and reciprocally movable therealong. Each of the ends of the drive member adjacent to a driven member is provided with teeth that are adapted to be meshed with the teeth of the adjacent driven member. A sprocket 49 is fixed to and radiates from drive member 48 and a chain 50 interconnects the sprocket 49 and a sprocket 51 on the output shaft 52 of a reversible electric motor 53.

The teeth formed on the driven members, function both as cams, moving the drive member away from or into meshing engagement with the driven members, and as a means of transmitting motion of the drive member, selectively, to the driven members.

At least one tooth is required on each driven member, but, as illustrated, it is preferred to have at least two such teeth. The teeth each project outwardly from their respective sleeve, to provide a push cam surface 54, FIG. 4, and are undercut to provide a pull cam surface 55. The push cam surface is circularly inclined away from the sleeve, in the direction the sleeve is to be rotated by the drive member.

The teeth provided on each end of the driven member are each projected outwardly from the drive member to provide a push cam follower surface 56 that is inclined in the direction in which the teeth are rotated when in mesh with a tooth of a driven member. The angle and length of the push follower cam surface 56 of each tooth of the drive member substantially coincides with the angle and length of each push cam surface 54 of each tooth of a driven member, with which it meshes. The teeth on the drive member are also undercut to serve as followers that will be traveled along the pull cam surfaces 55 as the drive member is moved into full meshing engagement with a driven member.

Figure 1:
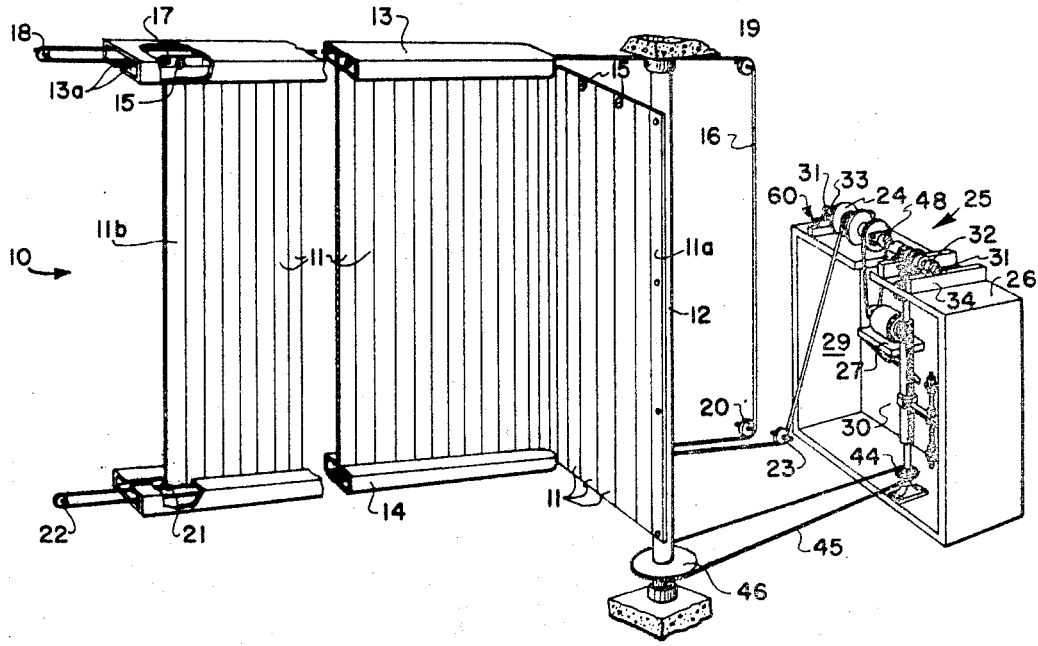
FIG. 1 is a fragmentary perspective view showing a partition and drive means therefor, according to the invention.

With the teeth arranged as disclosed, and assuming the drive member is in meshing engagement with the second driven member, operation of motor 53 to rotate drive member 48 in one direction, i.e. counterclockwise, as viewed in FIG. 1, will cause push cam follower surfaces 56 of the drive member to follow along the push cam surfaces 54 of the second driven member, thereby moving the drive member sufficiently far enough away from the second driven member that teeth on the opposite end of the drive member will contact the pull cam surfaces of the teeth of the first driven member. The teeth on the drive member then follow along the pull cam surfaces and the drive member is pulled into full meshing engagement with and rotates the first driven member, i.e. counterclockwise as viewed in FIG. 1. As was previously explained, this counterclockwise rotation of the first driven member and the bevelled gear 39 thereon is transmitted to post 12, which is turned to wind the partition 11 therearound. At the same time the second driven member is no longer in meshing engagement with the drive member and can rotate at any required speed as the cable 16 is pulled therefrom. In this case, the cable drum 24 and the second driven member will rotate at a variable, increasing speed as the partition is wrapped around the post 12 and the circumference of the partition roll increases. However, it should be apparent that the second driven member could as well be turned at constant or intermittent speeds.

When the motor 53 is operated to reverse the direction of rotation of the drive member 48, i.e. to drive it in a clockwise direction, as viewed in FIG. 2, push cam follower surfaces 56 of the drive member follow along on the push cam surfaces 54 of the teeth of the first driven member, thereby forcing the drive member to move away from the first driven member and into a position wherein teeth of the drive member will partially engage teeth of the second drive member. Continued driving of the drive member in the said clockwise direction will cause the teeth of the drive member to follow along the pull cam surfaces 55 of the teeth of the second driven member until the drive member and second driven member are in full meshing engagement, and the drive member is moved completely away from the first driven member. The first driven member, and the post 12 drivingly connected thereto are thus free for variable, constant or intermittent rotation, independently of the drive member 48.

The chain 50, interconnecting the sprocket of the drive member and the sprocket of motor 53, is sufficiently flexible to allow movement of the drive member between its full meshing engagements with the first and second driven members. However, if found necessary, the sprocket 51 on the output shaft of motor 53 can be arranged to positively move along its axis, parallel to the traveling sprocket 49.

A brake 60, shown best in FIG. 5, is used to provide a drag force on the cable drum 24. This prevents undesired unrolling of cable 16 and insures a positive disengagement of the drive member from the second driven member.

Brake 60 includes a pad 61 of long wearing friction material affixed to the faces of a backing plate 62. A stem 63 protrudes from the rear of the backing plate, through a housing cover 64 and terminates as a piston 65 that slides within a housing 66. A kerfed bolt 67 is threaded through the wall of housing 66 opposite the housing cover 64 and terminates in a head 68. A spring 69 in housing 66 is compressed between the end of the piston 65 and the head 68 so that the spring acts against the piston to push the brake pad 61 into engagement with the outer flange of cable drum 24. The amount of frictional drag, applied to the cable drum by the brake pad can be varied by turning bolt 67 into or out of member 66. The brake components can be repaired or replaced by simply removing bolts 66a that hold the housing cover 64 to housing 66.

The brake retards the cable drum and keeps it from turning faster than the cable is pulled therefrom, when partition 10 is being coiled around post 12. This, of course, keeps the cable from whipping away from the cable drum. The brake also holds the second driven member against its turning with the drive member when the drive member is turned in a disengaging direction, thereby insuring a positive disengagement of the drive member from the second driven member.

The first driven member is held against rotation with the drive member 48 when it is turned in its disengaging direction by the resistance of the bevelled gears and post 12 to such turning. Accordingly, positive disengagement of the drive member from each driven member is insured.

Shaft 41 is threaded intermediate its length and has a running nut 70 thereon. The nut has a bifurcated finger 71 projecting therefrom to straddle a guide rod 72 that is vertically fixed to the leg 28. Arms 73 and 74 project up and down, respectively, from finger 71 and each has a collar 75 threaded thereon such that it will engage one of the limit switches 76, affixed to the leg 28.

By threading the collars 75 up and down on the arms 73 and 74 the time at which they will contact the limit switches can be preset.

The limit switches are electrically connected to the motor 53 and serve to stop the motor when the partition 10 is fully extended or fully coiled.

In operation, assuming the partition to be fully coiled, a conventional switch, not shown, is manipulated to operate motor 53 and drive its output shaft clockwise. This drives member 48 into meshing engagement with the second driven member and rotates the cable drum 24 to wind cable 16 thereon. As the cable is wound onto the cable drum, it is pulled around pulley 22 and the lower end of the lead stile 11b is pulled toward the pulley 22. At the same time cable 16 is pulled an equal distance around pulleys 20, 19 and 18 and the upper end of the lead stile 11b is simultaneously pulled toward pulley 18.

As the partition is pulled from post 12, the post rotates and through sprocket 46, chain 45 and sprocket 44, it turns shaft 41. Nut 70 is held against rotation by the engagement of its finger 71 with guide rod 72, so nut 70, the finger and the arms 73 and 74 move down until the collar 75 on arm 73 contacts the lower limit switch to break the circuit driving motor 53 in the one direction and thereby stop the motor. At this point, the partition is fully extended.

By manipulating the control switch, not shown, to start motor 53 operating in its reverse direction, the drive member is turned in the opposite direction and is cammed away from the second drive member and into meshing engagement with the first driven member to drive shaft 41 and the post 12, as previously explained. As post 12 is turned the partition is wound thereon and the cable 16 is pulled from cable drum 24. At the same time nut 70 is traveled axially upwardly along shaft 41 until the collar 75 on arm 73 contacts the upper limit switch to break the power circuit to motor 53. At this time the partition is fully retracted and is fully coiled about post 12.

The cycle of operation can be repeated by merely manipulating the control switch whenever desired.

It is also possible to partially extend and retract the partition, merely by manipulating the control switch, not shown.

The drive mechanism herein disclosed is particularly useful in the combination shown and described, but can obviously be used for other purposes as well.

I claim:
1. In combination,
 a coilable partition having a lead end and a secured end;
 guide means for the partion;
 a cable arranged to be connected to pull on the lead end of the partition to travel the partition along the guide means;
 a drum to which one end of the cable is connected;
 a post to which the secured end of the partition is connected;
 means for mounting said post for axial rotation; and
 drive means for alternatively driving the cable drum to wind the cable thereon and for driving the post to wind the partition thereon, said drive means comprising a non-rotatable main shaft, a first driven member rotatable on said main shaft and secured against axial travel therealong, means drivingly connecting said first driven member to the post whereby said first driven member and the post rotate together, a second driven member spaced from the first driven member, said second driven member being connected to the drum for rotation therewith and being rotatable about the main shaft but secured against axial travel therealong, a drive member arranged between the first and second driven members, means comprising a reversible motor having an output shaft, and flexible means interconnecting the output shaft and the exterior of the drive member for selectively turning said drive member in opposite directions, and cooperating means on the said drive and driven members whereby turning of said drive member in one direction will move it fully away from the first driven member and into driving engagement with the second driven member and turning of said drive member in the opposite direction will move the drive member fully away from the second driven member and into driving engagement with the first driven member.

2. The combination of claim 1, wherein said means drivingly connecting said first driven member to the post, whereby they rotate together includes
 a threaded shaft having
  means at one end thereof drivingly connected to the first driven member,
  means at the other end thereof drivingly connected to the post; and further including
 a threaded member on the threaded shaft;
 means restraining said threaded member against rotation, while allowing it to move axially along the threaded shaft;
 a pair of spaced limit switches for controlling the motor; and
 means carried by the threaded member for operating the switch means to thereby control the motor.

3. In combination,
 a coilable partition having a lead end and a secured end;
 guide means for the partition;
 a cable arranged to be connected to pull on the lead end of the partition to travel the partition along the guide means;
 a drum to which one end of the cable is connected;
 a post to which the secured end of the partition is connected;
 means for mounting said post for axial rotation; and
 drive means for alternatively driving the cable drum to wind the cable thereon and for driving the post to wind the partition thereon, said drive means comprising a main shaft, a first driven member rotatable on said main shaft and secured against axial travel therealong, means drivingly connecting said first driven member to the post whereby said first driven member and the post rotate together, a second driven member spaced from the first driven member, said second driven member being connected to the drum for rotation therewith and being rotatable about the main shaft but secured against axial travel therealong, a drive member arranged between the first and second driven members, means for selectively turning said drive member in opposite directions, and cooperating means on the said drive and driven members comprising teeth on the driven members each having a push cam surface circularly inclined away from its driven member in the direction opposite to the direction the driven member is turned when in mesh with the drive member and being undercut to form a pull cam surface, and at least one tooth on each end of the drive member arranged to mesh with one of the said teeth on the adjacent driven member, each tooth on the drive member thereby having a push cam follower surface and being undercut so that the tooth serves as a pull cam surface follower, whereby turning of said drive member in one direction will move it fully away from the first driven member and into driving engagement with the second driven member and turning of said drive member in the opposite direction will move the drive member fully away from the second driven member and into driving engagement with the first driven member.

4. The combination of claim 3, wherein
a plurality of teeth are provided on each end of the drive member; and
a corresponding plurality of teeth are provided on each driven member.

5. A drive means for coilable partitions and the like comprising
a non-rotatable main shaft;
a first driven member, rotatable on said main shaft and secured against axial travel therealong;
a second driven member spaced from the first driven member, said second driven member being rotatable about the main shaft and secured against axial travel therealong;
a drive member arranged between the first and second driven members;
means for selectively turning said drive member in opposite directions, said means including a motor having an output shaft and flexible means interconnecting the drive shaft and the exterior of the member;
cooperating means on the said drive and driven members whereby turning of said drive member in one direction will move it fully away from the first driven member and into driving engagement with the second driven member, and turning of the said drive member in the opposite direction will move the drive member fully away from the second driven member and into driving engagement with the first driven member.

6. The combination of claim 5, wherein said means drivingly connecting said first driven member to the post, whereby they rotate together includes
a threaded shaft having
means at one end thereof drivingly connected to one of the driven members,
means at the other end thereof drivingly connected to the posts; and further including
a threaded member on the threaded shaft;
means restraining said threaded member against rotation, while allowing it to move axially along the threaded shaft;
a pair of spaced limit switches for controlling the motor; and
means carried by the threaded member for operating the switch means to thereby control the motor.

7. A drive means for coilable partitions and the like comprising
a main shaft;
a first driven member, rotatable on said main shaft and secured against axial travel therealong;
a second driven member spaced from the first driven member, said second driven member being rotatable about the main shaft and secured against axial travel therealong;
a drive member arranged between the first and second driven members;
means for selectively turning said drive member in opposite directions; and
cooperating means on the said drive and driven members comprising teeth on the driven members each having a push cam surface circularly inclined away from its driven member in the direction opposite to the direction the driven member is turned when in mesh with the drive member and being undercut to form a pull cam surface, and at least one tooth on each end of the drive member arranged to mesh with one of the said teeth on the adjacent driven member, each tooth on the drive member thereby having a push cam follower surface and being undercut so that the tooth serves as pull cam surface follower, whereby turning of said drive member in one direction will move it fully away from the first driven member and into driving engagement with the second driven member, and turning of the said drive member in the opposite direction will move the drive member fully away from the second driven member and into driving engagement with the first driven member.

8. The combination of claim 7, wherein
a plurality of teeth are provided on each end of the drive member; and
a corresponding plurality of teeth are provided on each driven member.

9. The drive means of claim 8, wherein
a main shaft is non-rotatable; and
the means for selectively turning said drive member comprises a motor having an output shaft, a sprocket on the output shaft, a sprocket on the drive member, and a chain in meshing engagement with the said sprockets.

References Cited
UNITED STATES PATENTS 2,934,139   4/1960   Wardlaw et al. ____ 160—133 X
2,978,019   4/1961   Carlo _____ 160—23

DAVID J. WILLIAMOWSKY, Primary Examiner

J. K. BELL, Assistant Examiner

U.S. Cl. X.R.
160—133